July 22, 1952 A. P. GLENNY 2,604,074
AUTOMATIC PILOT FOR AIRCRAFT
Filed March 30, 1948
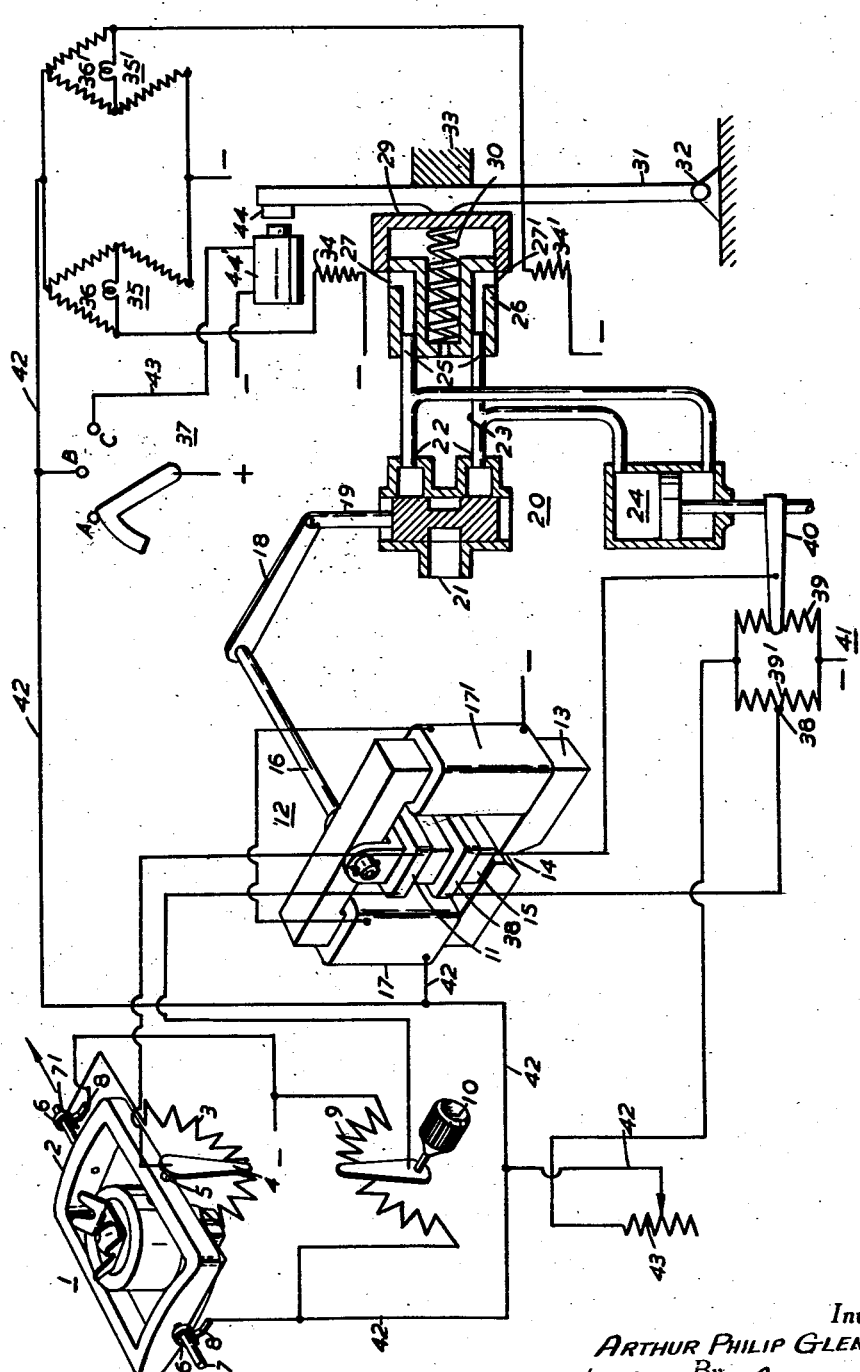
Inventor
ARTHUR PHILIP GLENNY
By
Herbert H. Thompson
his Attorney.

Patented July 22, 1952

2,604,074

UNITED STATES PATENT OFFICE 2,604,074

AUTOMATIC PILOT FOR AIRCRAFT

Arthur Philip Glenny, Hanworth, England, assignor to The Sperry Corporation, a corporation of Delaware Application March 30, 1948, Serial No. 18,004

5 Claims. (Cl. 121—38)

The present invention relates to improvements in automatic control systems or automatic pilots for controlling a craft to maintain a desired attitude or path and, in particular, to improvements in means for ensuring that an automatic pilot is correctly adjusted before it is put into operational control of the craft.

An automatic pilot controls a craft by actuating a control surface by means of a servo-motor. The servo-motor is caused to move in one direction or the other by the supply to it of power under control of a relay, e. g., an electric relay or a valve, which is itself usually controlled by control quantities supplied, on the one hand, by instruments monitoring the flight of the craft responsive to departure of the craft from some desired condition, e. g., course, or attitude, and, on the other hand, by manual adjustments that set particular values of the desired flight conditions, e. g., the desired course, or desired attitude, of the craft, to be maintained by the monitoring instruments.

When it is desired to put an automatic pilot into control of a craft, the final relay that directly controls the supply of power to the servo-motor (and perhaps some preliminary relays that control the final relay) is not put into operational control of the servo-motor until after the control arrangements for developing the control quantities are energized, and the source, e. g., a pump or electric generator, from which the servo-motor is energized under the control of the final relay, is rendered operative. The final step in the process of putting the automatic pilot into control of the craft is therefore one in which the final relay, and perhaps also some other relays in the chain of control, is rendered effective to control the servo-motor.

Should a fault, such as the sticking of a valve or a disconnection in an electric circuit in the apparatus, exist, or should a manual adjustment set into the apparatus to develop a signal that will maintain a desired flight condition of the craft not be appropriate to maintain the existing flight condition, the change from manual to automatic control may result in the craft assuming suddenly a dangerous attitude. The principal object of the invention is to provide, in an automatic pilot, means for indicating the operational state of the apparatus immediately before the craft is put under its control.

According to the invention an automatic control system is provided of the kind in which a signal or signals derived from a reference instrument or instruments controls actuation of a control surface through a servo-system that includes a final relay directly controlling operation of a servo-motor actuating the surface, characterized in that a switch device is provided for putting the automatic control system into control of the craft in two successive stages in the first of which all parts of the system that determine the operation of the final relay are rendered operative so that the final relay is actuated but is prevented from effecting actuation of the servo-motor, while in the second stage the final relay is put into operational control of the servo-motor and in that an indicator is provided for indicating the operational state of the final relay during the first stage.

One embodiment of an automatic control system according to the invention as applied to control the elevator of an aircraft will now be described with reference to the accompanying drawing, by way of example.

In the drawing 1 is a gyro vertical with its casing (not shown) mounted on the craft in such a way that the outer axis of the gyroscope lies along the longitudinal axis of the craft. On the outer gimbal-frame 2 is fixed the winding 3 of a potentiometer, whose wiper 4 is fixed to the inner gimbal-frame shaft 5. The ends of the winding 3 are connected to slip-rings 6 carried on the shafts 7, 7' of the outer gimbal-frame, the slip-rings co-operating with brushes 8 mounted on the gyro-vertical casing and connected to the ends of the winding 9 of a second potentiometer mounted on the craft and provided with a manually adjustable wiper 10. The wipers 4 and 10 are connected to the control coil 11 carried on the tongue 15 of a polarised relay 12. The tongue also carries a second coil 38 connected to a potentiometer 41 actuated by servo-motor 24 to provide a feed-back signal. Potentiometer 41 comprises two resistor coils 39, 39', energised in parallel, and the mid-point 38 of coil 39' being connected to one side of the coil 38, and the wiper 40 to the other side. The wiper co-operates with resistor 39 and is actuated by servo-motor 24. A variable resistance 43 is inserted in lead 42 connecting the potentiometer 41 to the positive side of the source through a three-position switch 37 to be described presently.

The relay is in the form of a rectangular frame 13 of magnetic material with an air gap 14 in the bottom side, the tongue 15 being fixed to a shaft 16 mounted for angular movement about an axis in the middle of the top side of the frame and perpendicular to the plane of the frame.

The vertical sides of the frame carry polarising windings 17, 17'. Fixed to the shaft 16 is a link 18 connected to the piston 19 of the pneumatic control switch or final relay 20 of known type. The final relay has its inlet port 21 connected to a source of air pressure (not shown) and its outlet ports 22 connected by conduits 23 to the pneumatic servo-motor 24 of known type, and also to the two inlet ports 25 of a by-pass valve 26 shown in section in the drawing. Each inlet port of the by-pass valve is connected to a long narrow outlet port in the form of a slot whose transverse section is shown in the drawing and which is opened or closed by a cap or slider 29 which moves in a direction perpendicular to the lengths of the slot. The outlet ports are normally maintained open by the action of a compression spring 30 which presses the slider against an arm 31, pivoted at 32 and resting against a stop 33 fixed relatively to the craft. A solenoid 44' is arranged above the valve and attracts an armature 44 carried near the top of the arm when energized, thus moving the arm about the pivot 32 and moving the slider 29 to close the slot ports 27. Close to each slot and arranged so as to be subjected to air currents issuing therefrom is a resistance 34, 34' each of which forms one arm of a bolometer bridge across which is connected a lamp 36 or 36'. The three-position switch 37 is arranged so that in its "off" or "A" position, the source of electrical energy (not shown), is disconnected, while in its "test" or "B" position, the positive side of the source is connected by lead 42 to energise the potentiometer windings 3 and 9 in parallel, the polarising coils of the relay 17 in series, the two bolometer bridges 34, 34' in parallel, and the final relay 20 to a source of air pressure (not shown). In the "on" or "C" position, the switch, in addition to maintaining the connections made in the "B" position, also connects the source to energise the solenoid 41' by lead 43.

The operation of the apparatus will now be explained. When the switch 37 is in the "off" position, the electrical circuits are disconnected from the source and, the valve 26 being open, the servo-motor is ineffective. On moving the switch to the "test" position the electrical circuits except for solenoid 44', are connected to this source of electrical energy and the final relay 20 is connected to its source of air pressure by means not shown. In order that the pitch of the craft may not be disturbed by putting the automatic control apparatus in control of the craft the final relay 20 should then be centralised so that no air currents should issue from slots 27, 27', in by-pass valve 26, resistances 34, 34' being at the same temperature and the bridges balanced so that the lamps 36, 36' will both be unlit. If, however, due to some cause such as a fault in the electrical circuits or stickiness of relay valve 20, an air current issues from slot 27, say, lamp 36 will light up and warn the pilot of the craft of the unsatisfactory state of the apparatus, in which case he will refrain from putting the apparatus into control of the aircraft until the fault has been rectified. When the state of the lamps indicate that the final relay 20 is centralised, the pilot moves the switch to the "on" position, whereupon the solenoid 44' is also energised from the source, and moves the arm 31 and the slider 29 against the spring 30 thus closing the slots 27, 27' and making the final relay 20 effective to control servo-motor 24.

I claim:

1. In an automatic pilot for aircraft adapted to be thrown in and out of use, a master control instrument, a pick-off thereat for generating a control signal of low power, a servo-motor, a normally centralized relay between said instrument and motor for actuating the latter, said relay being responsive to said low power signal and including a means for controlling the application of a higher power to said motor, a two-stage starting switch for putting the pilot into control, the first stage of said switch energizing said relay and low power control system, safety means for preventing said relay from applying said higher power to said servo-motor, and a warning signal actuated in case said relay is on centralized when energized tending to prevent the starting switch from being moved to the second stage until said relay is centralized.

2. In an automatic pilot for aircraft adapted to be thrown in and out of use, a master control instrument, a pick-off thereat for generating a control signal of low power, a second manually adjustable pick-off, both opposing the signal from said first pick-off, a servo-motor, a normally centralized relay between said instrument an motor for actuating the latter, said relay being responsive to the net signal from said pick-offs and including a valve for controlling the application of a higher power to said motor, safety means for initially preventing said relay from applying said higher power to said servo-motor, a warning signal, and means for bringing said warning signal into operation with said safety means before the pilot becomes operative if any net signal is present to hold said relay off its neutral position.

3. In an automatic pilot for aircraft adapted to be thrown in and out of use, a master control instrument, a pick-off thereat for generating a control signal of low power, a servo-motor, a follow-back pick-off at said servo-motor, a third manually adjustable pick-off, both opposing the signal from said first pick-off, a normally centralized relay between said instrument and motor for actuating the latter, said relay being responsive to the net signal from said pick-offs and including a valve for controlling the application of a higher power to said motor, safety means for initially preventing said relay from applying said higher power to said servo-motor, a warning signal, and means for bringing said warning signal into operation with said safety means before the pilot finally becomes operative if any net signal is present to hold the relay off its neutral position.

4. In an automatic pilot for aircraft adapted to be thrown in and out of use, a master control instrument, an electrical pick-off thereat for generating a reversible signal on relative tilt of the craft and instrument proportional to the tilt, a second manually adjustable pick-off for modifying said other signal to change the attitude of the craft, an electro-fluid pressure relay controlled by the net signal from said pick-offs, a fluid pressure servo controlled by said relay for operating a control surface of the craft, a two-stage switch for throwing in the pilot, and means responsive to any unbalance pressure leading to said motor from said relay when the switch is in the first stage for operating a means preventing turning of the switch to its second position.

5. A safety device for airplane automatic pilots as claimed in claim 4, wherein said by-pass means includes a normally open bypass valve in each of the two pressure lines between the relay and motor, means responsive to unequal flow therefrom for causing the pilot to contralize his controls, and means for closing said bypass upon said switch being placed in its second position.

ARTHUR PHILIP GLENNY.

REFERENCES CITED

The following references are of record in the file of this patent:

UNITED STATES PATENTS

| Number | Name | Date |
|---|---|---|
| 1,022,865 | Nicolai | Apr. 9, 1912 |
| 2,197,898 | Roland | Apr. 23, 1940 |
| 2,370,076 | Rosenberger | Feb. 20, 1945 |
| 2,373,621 | Wales | Apr. 10, 1945 |
| 2,398,421 | Frische | Apr. 16, 1946 |
| 2,416,097 | Hansen | Feb. 18, 1947 |